April 4, 1939.　　　　F. MORELLA　　　　2,153,151
SPEED CHANGING MECHANISM
Filed June 4, 1938
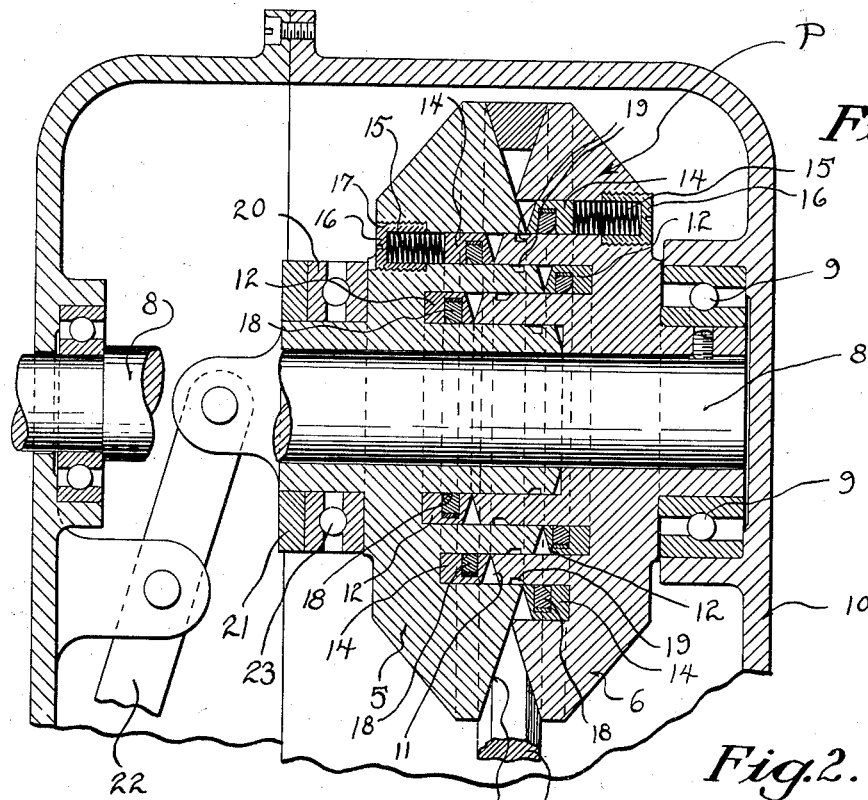
Fig.1.
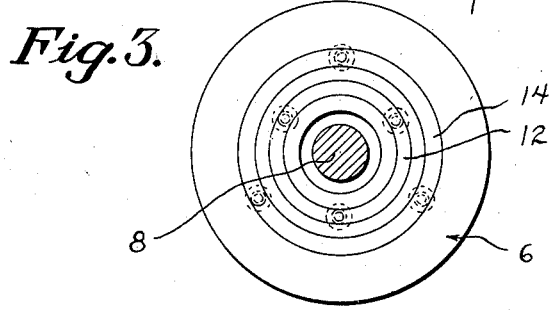
Fig.3.
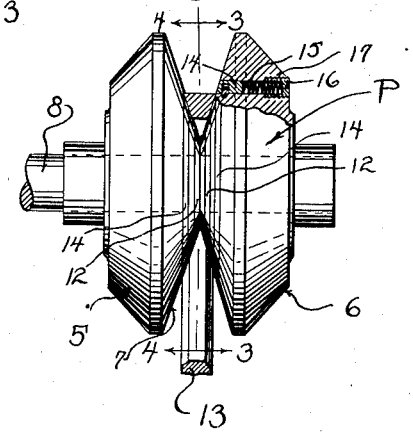
Fig.2.
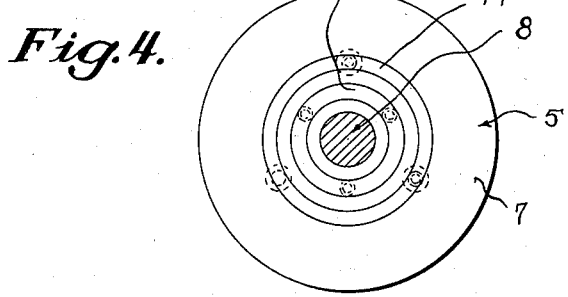
Fig.4.
Inventor.
Frank Morella
By
Attorneys.

Patented Apr. 4, 1939

2,153,151

UNITED STATES PATENT OFFICE 2,153,151

SPEED CHANGING MECHANISM

Frank Morella, Milwaukee, Wis., assignor of one-fourth to H. C. Bennallack, Milwaukee, Wis.

Application June 4, 1938, Serial No. 211,737

5 Claims. (Cl. 74—230.17)

This invention appertains to speed changing mechanism, and more particularly to a variable pulley.

One of the primary objects of my invention is to provide a pulley, which can be expanded or contracted to vary its operative diameter, whereby the speed of the pulley or the pulley belt, as the case may be, can be changed without the employance of any other speed changing mechanism.

Another salient object of my invention is to provide a pulley embodying companion sections telescoping one within the other, whereby to change the active diameter of the pulley without disturbing the flush driving faces of the pulley so that no undue wear will take place on the pulley belt.

A further important object of my invention is to provide a pulley embodying companion half sections, one of which is movable toward the other, both of the sections embodying interfitting annular ribs and channels, the channels having spring-pressed rings therein to close said channels upon the separation of the sections, whereby to maintain smooth working faces at all times on the pulley sections.

A still further object of my invention is to provide a pulley of the above character, which will be durable and efficient in use, one that will be simple and easy to manufacture, and one which can be placed upon the market at a reasonable cost.

With these and other objects in view the invention consists in the novel construction, arrangement and formation of parts, as will be hereinafter more specifically described, claimed, and illustrated in the accompanying drawing, in which drawing:

Figure 1 is a diametric section through my improved pulley, showing the same in use and its collapsed or contracted position.

Figure 2 is a side elevational view of my improved pulley, with parts thereof broken away and in section, the pulley being shown on a smaller scale than Figure 1, and in its fully open or expanded position.

Figure 3 is a transverse sectional view through the pulley taken substantially on the line 3—3 of Figure 2, looking in the direction of the arrows.

Figure 4 is a view similar to Figure 3, but taken on the line 4—4 of Figure 2, looking in the direction of the arrows.

Referring to the drawing in detail, wherein similar reference characters designate corresponding parts throughout the several views, the letter P generally indicates my novel pulley, and, as illustrated, the same includes a pair of companion sections 5 and 6. The sections 5 and 6 are of a substantially solid construction, and each is provided with an inclined inner drive face 7. These faces taper inwardly from the peripheries of the sections toward their axial centers, and the inclination of the faces of the sections is the same.

By referring to Figure 1, it can be seen that I have shown one use of my pulley, and thus the sections 5 and 6 are mounted upon a shaft 8. This shaft can be rotatably mounted in suitable bearings 9. These bearings, in turn, can be supported by the walls of an enclosing casing 10. The section 6 can be keyed, or otherwise rigidly secured, to the shaft 8, and the section 5 can be feathered, or otherwise slidably mounted, upon the shaft 8. Thus, both sections are movable or rotatable with the shaft 8.

In order to change the active operative diameter of my pulley the section 5 is movable toward the section 6, and the two sections are adapted to telescope one within the other. Thus, the mating faces of the sections 5 and 6 are each provided with spaced, annular grooves or channels 11. The spaces between the channels 11 define annular ribs 12. The ribs and channels of the sections 5 and 6 are staggeredly related relative to one another, so that the ribs of the section 6 can slide into the channels of the section 5. By this arrangement and construction the sections 5 and 6 can telescope one within the other to change the operative diameter of the pulley without changing the inclination of the inner faces of the pulley. Thus, the inclined faces of the pulley will always be snugly engaged by the pulley belt 13, which can be trained about the same.

It is essential that the inclined faces of the pulley sections remain smooth at all times; otherwise undue wear will take place on the pulley belt. To provide the uninterrupted or smooth faces I slidably mount within the grooves or channels 11 rings 14. These rings 14 are normally urged toward the opposite pulley sections by means of expansion coil springs 15. These coil springs 15 are held in place by hollow screws 16, which are threaded into bores 17 formed in the pulley sections. Obviously, the bores 17 communicate with the grooves or channels 11.

In order to prevent the spring-pressed rings 14 from being urged too far out of the channels or grooves 11, the rings carry at spaced points spring-pressed latches or dogs 18, and these dogs are adapted to snap into keeper notches 19 formed in the walls of the grooves or channels 11. It is to be noted that one wall of the keeper notches and one edge of each dog are tapered so that the dogs will be permitted to snap out of the keeper notches when the rings are being forced into their channels.

The section 5 can be shifted on the shaft 8 in any desired or approved manner, and, as shown in Figure 1, I have provided a thrust ring 20 for engaging one face of the pulley section 5. This thrust ring can be moved back and forth by means of a pusher collar 21, to which is pivotally connected an operating lever 22. Anti-friction bearings 23 can be interposed between the thrust ring 21 and the face of the pulley section.

While I have stated that the ribs and channels are of an annular form, it is to be understood that my invention contemplates any ribs and channels which extend entirely and continuously around the sections, or any other type of mating ribs and grooves, providing means is employed for automatically closing said grooves to maintain smooth driving faces on the pulley.

From the foregoing description it can be seen that I have provided a novel speed changing mechanism, which includes an expansible pulley embodying companion sections telescoping one within the other.

Changes in details may be made without departing from the spirit or the scope of my invention, but what I claim as new is:

1. A pulley for speed changing mechanism comprising a pair of independent sections, one of which at least is movable toward the other, the meeting faces of each of the sections being provided with mating annular ribs and channels, whereby the sections can be telescoped one within the other.

2. A pulley for speed changing mechanism comprising a pair of companion sections, one of which at least is movable toward and away from the other, each of said sections having their meeting faces provided with mating annular ribs and channels, and spring-pressed rings slidably mounted in the channels and normally closing the entrance to said channels, whereby to maintain a smooth inner face of each of the sections.

3. A pulley for speed changing mechanism comprising a pair of companion sections, one of which at least is movable toward and away from the other, each of said sections having their meeting faces provided with mating annular ribs and channels, spring-pressed rings slidably mounted in the channels and normally closing the entrance to said channels, whereby to maintain a smooth inner face of each of the sections, and means for limiting the outward movement of the rings in said channels.

4. A pulley for speed changing mechanism comprising a pair of independent sections, one of which at least is movable toward the other, the meeting faces of each of the sections being provided with mating continuous ribs and channels, whereby the sections can be telescoped one within the other.

5. A pulley for speed changing mechanism comprising, a pair of independent sections, at least one of which is movable toward the other, the meeting faces of each of the sections being provided with mating ribs and grooves, whereby the sections can be telescoped one within the other, and means for closing the grooves, whereby to maintain a smooth inner face on the sections.

FRANK MORELLA.